(12) United States Patent
Altrichter et al.

(10) Patent No.: US 7,493,209 B1
(45) Date of Patent: Feb. 17, 2009

(54) METHOD OF CALCULATING A ROUTE BASED ON ESTIMATED ENERGY CONSUMPTION

(75) Inventors: Ralf Altrichter, Filderstadt (DE); Dirk Heuzeroth, Stuttgart (DE); Gerd Kehrer, Meckenheim (DE); Robert Martin Raitza, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/099,116

(22) Filed: Apr. 7, 2008

(51) Int. Cl.
*G08G 1/123* (2006.01)
(52) U.S. Cl. ................. 701/202; 340/902
(58) Field of Classification Search ............ 701/123, 701/201, 213, 207, 209, 200, 202, 210, 117, 701/24, 208, 206, 211; 340/902, 991, 995.19, 340/988, 995.12, 995.23; 73/178 R; 342/357.1, 342/357.13
See application file for complete search history.

(56) References Cited

U.S. PATENT DOCUMENTS

| | | | |
|---|---|---|---|
| 5,742,922 A | 4/1998 | Kim | |
| 6,005,494 A | 12/1999 | Schramm | |
| 6,526,349 B2 | 2/2003 | Bullock et al. | |
| 6,678,611 B2* | 1/2004 | Khavakh et al. | ............ 701/210 |
| 6,714,857 B2 | 3/2004 | Kapolka et al. | |
| 6,807,483 B1 | 10/2004 | Chao et al. | |
| 7,010,425 B2* | 3/2006 | Gray et al. | ................. 701/202 |
| 7,054,742 B2* | 5/2006 | Khavakh et al. | ............ 701/209 |

* cited by examiner

*Primary Examiner*—Dalena Tran
(74) *Attorney, Agent, or Firm*—McGinn IP Law Group, PLLC

(57) ABSTRACT

A method of calculating a navigation route based on an estimated energy consumption value that assigns a distance weight coefficient for each of the plurality of potential routes that corresponds to an estimated distance energy consumption value. The method also determines a cumulative interference weight coefficient for each of the plurality of potential routes corresponding to an estimated interference energy consumption value based on traversing at least one interference event in the potential route. Each cumulative interference weight coefficient may include a fixed event interference weight coefficient, a probable event interference weight coefficient, and a scheduled event interference weight coefficient. The system then determines total route energy consumption weight coefficients for each of the plurality of potential routes by adding the distance and cumulative interference weight coefficients, and selects a route from the plurality of potential routes based on a lowest total route energy consumption weight coefficient.

1 Claim, 3 Drawing Sheets

| INTERFERENCE EVENT TABLE ||||
|---|---|---|
| FIXED INTERFERENCE EVENTS (22) | PROBABLE INTERFERENCE EVENTS (24) | SCHEDULED INTERFERENCE EVENTS (26) |
| 1) CHANGE IN ALTITUDE<br>2) CURVE RADIUS<br>3) SPEED REDUCING FEATURES<br>  A) STOP SIGN<br>  B) ROUND-ABOUT<br>4) SPEED LIMIT CHANGES<br>5) MINIMUM POSTED SPEED LIMIT | 1) SPEED REDUCING FEATURES<br>  A) TRAFFIC LIGHT<br>  B) PEDESTRIAN CROSSING<br>  C) LIVESTOCK CROSSING<br>  D) TRAIN CROSSING<br>  E) YIELD/RIGHT OF WAY<br>  F) FERRY<br>  G) WEATHER FEATURE | 1) SPEED REDUCING FEATURES<br>  A) STOP SIGN*<br>  B) ROUND ABOUT*<br>  C) PEDISTRIAN/SCHOOL CROSSING DURING SCHOOL HOURS*<br>  D) TRAIN CROSSING ON SCHEDULE*<br>  E) YIELD/RIGHT OF WAY*<br>  F) FERRY ON SCHEDULE*<br>2) SPEED LIMIT CHANGES ON SCHEDULE*<br>3) TRAFFIC PATTERN SCHEDULE<br>(*USING DATA FROM A TRAFFIC PATTERN SCHEDULE) |

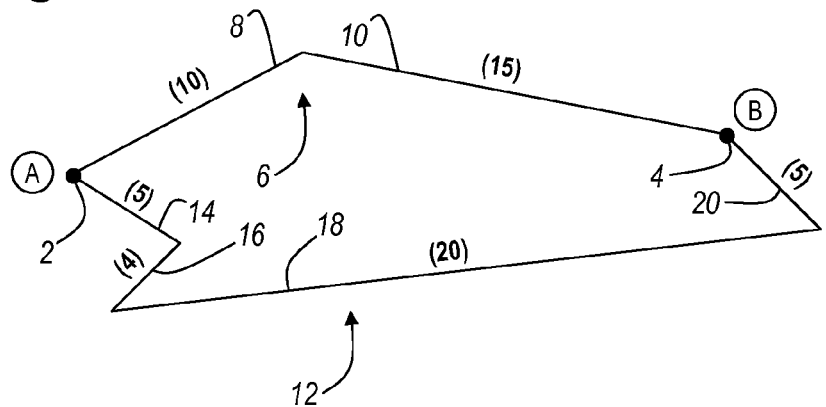

Fig. 2

| INTERFERENCE EVENT TABLE ||| 20 |
|---|---|---|
| FIXED INTERFERENCE EVENTS (22) | PROBABLE INTERFERENCE EVENTS (24) | SCHEDULED INTERFERENCE EVENTS (26) |
| 1) CHANGE IN ALTITUDE<br>2) CURVE RADIUS<br>3) SPEED REDUCING FEATURES<br>  A) STOP SIGN<br>  B) ROUND-ABOUT<br>4) SPEED LIMIT CHANGES<br>5) MINIMUM POSTED SPEED LIMIT | 1) SPEED REDUCING FEATURES<br>  A) TRAFFIC LIGHT<br>  B) PEDESTRIAN CROSSING<br>  C) LIVESTOCK CROSSING<br>  D) TRAIN CROSSING<br>  E) YIELD/RIGHT OF WAY<br>  F) FERRY<br>  G) WEATHER FEATURE | 1) SPEED REDUCING FEATURES<br>  A) STOP SIGN*<br>  B) ROUND ABOUT*<br>  C) PEDISTRIAN/SCHOOL CROSSING DURING SCHOOL HOURS*<br>  D) TRAIN CROSSING ON SCHEDULE*<br>  E) YIELD/RIGHT OF WAY*<br>  F) FERRY ON SCHEDULE*<br>2) SPEED LIMIT CHANGES ON SCHEDULE*<br>3) TRAFFIC PATTERN SCHEDULE<br>(*USING DATA FROM A TRAFFIC PATTERN SCHEDULE) |

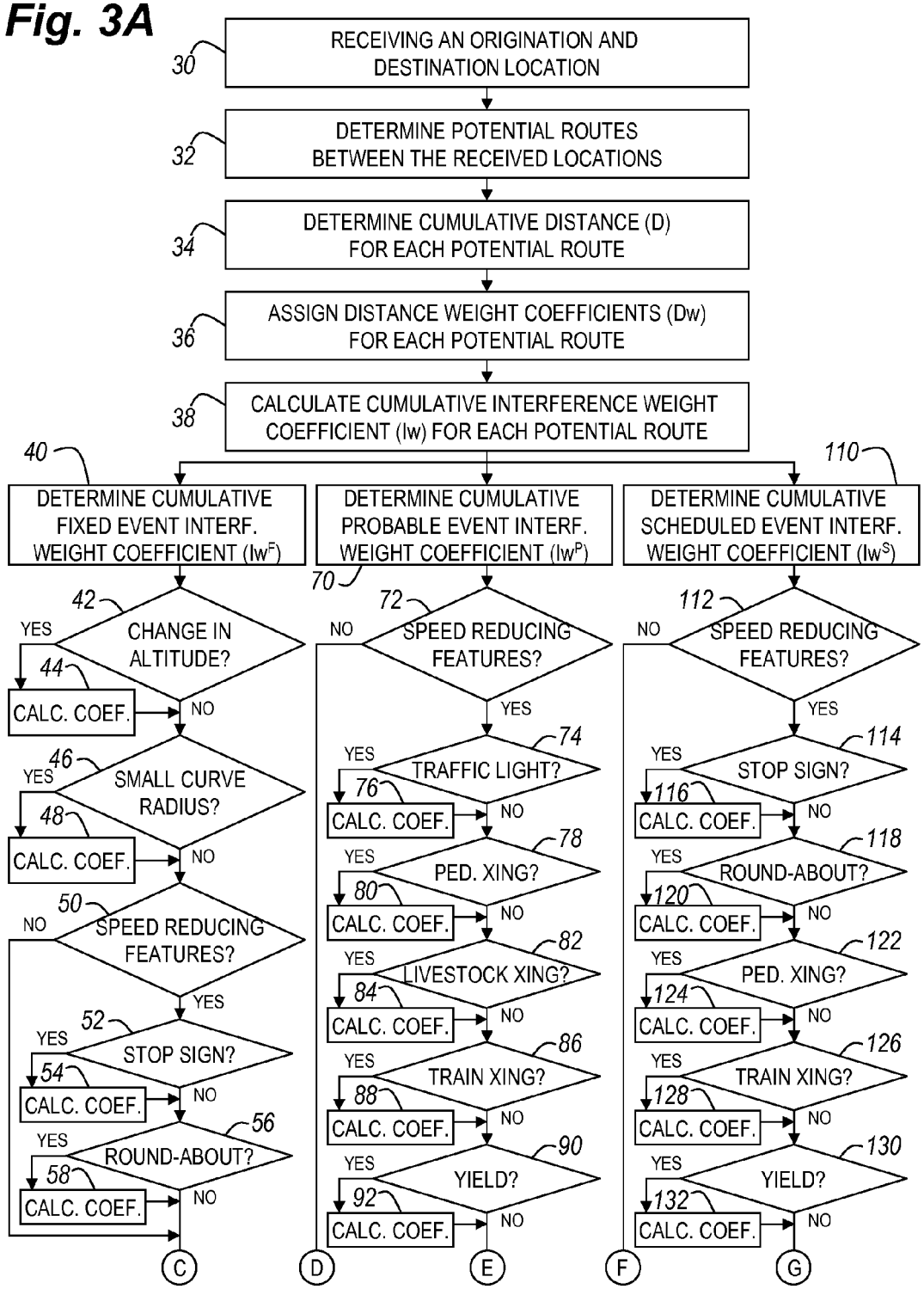

METHOD OF CALCULATING A ROUTE BASED ON ESTIMATED ENERGY CONSUMPTION

BACKGROUND OF THE INVENTION

1. Field of the Invention

The present invention generally relates to a navigation route calculation method in mobile navigation systems or internet navigation systems providing services where a method is employed to calculate routes with the lowest energy consumption. Calculating routes based on the lowest energy consumption may result in saving energy even if a selected route may have a longer distance or may take a longer time than another route.

2. Description of the Related Art

Today's mobile navigation systems contain map information stored on a local storage system, (hard disk, flash memory, etc.), and offer a user interface driven by local software to calculate the route from a specified start point to a specified target destination. These navigation systems dynamically navigate the user to the target destination using GPS signals to calculate the user's current position.

Mobile navigation systems and network computer-based navigation systems contain map information typically stored on a mobile navigation system's local storage or in a networked computer database. A user typically interacts via a software driven user interface to enable selection and calculation of a route from a specified origination location to a specified target destination.

During the process of calculating a route, the navigation system typically determines a number of alternative routes before displaying the selected route to the user. Alternatively, the navigation system predetermines which intermediate routes may be used to calculate the final route based on certain user selected parameters that affect total time and total distance values in determining a route.

The user influences the calculation method by determining a route typically based on the shortest travel time, the shortest route, or a combination of these two options, i.e., an "optimized route" including both features of travel time and distance. Typically, navigation systems may select a navigation route based on one of these three options depending on a user selected means of travel, i.e., the route is to "optimized" for automobiles, commercial vehicles, cyclists, pedestrians, etc.

To calculate a potential route, a navigation system determines the overall distance by individually determining the distance of each individual section of the route. Each individual route section represents a general type of road, e.g., highway, country road, inner city, etc.

These "road types" have specific characteristics which influence the route calculation, and selection based on average speed and limitations regarding specific vehicles, etc.

However, the prior art has not shown any capacity to select a navigation route based on estimated energy consumption factors affecting fuel economy that a traveler may encounter, for example, the grade of particular portions of road in a route, or the number of stops or potential delays in a route.

SUMMARY OF THE INVENTION

In view of the foregoing and other exemplary problems, drawbacks, and disadvantages of the conventional methods and structures, a purpose of the exemplary aspects of the present invention is to provide a method of calculating a navigation route based on an estimated energy consumption value.

An exemplary aspect of the present invention includes a method of calculating a navigation route based on an estimated energy consumption value, the method including receiving an origination location and a destination location, determining a plurality of potential routes based on map route data between the origination location and the destination location, determining a cumulative distance for each of the plurality of potential routes, assigning a distance weight coefficient for each cumulative distance for each of the plurality of potential routes, the distance weight coefficient corresponding to an estimated distance energy consumption value based on the determined cumulative distance, determining a cumulative interference weight coefficient for each of the plurality of potential routes, the cumulative interference weight coefficient corresponding to an estimated interference energy consumption value based on traversing at least one interference on the potential route, the cumulative interference weight coefficient comprises the sum of: a cumulative fixed event interference weight coefficient, a cumulative probable event interference weight coefficient, and a cumulative scheduled event interference weight coefficient, determining total route energy consumption weight coefficients for each of the plurality of potential routes by adding the distance weight coefficients of each of the plurality of potential routes to the corresponding cumulative interference weight coefficients of each of the plurality of potential routes, and selecting a route from the plurality of potential routes based on a lowest total route energy consumption weight coefficient from the determined total route energy consumption weight coefficients, wherein the cumulative fixed event interference weight coefficient is calculated by adding a value of: a cumulative change in altitude interference weight coefficient based on a cumulative change in altitude between the origination location and the destination location, a curve radius interference weight coefficient based on a size of a curve radius between the origination location and the destination location, and a speed reducing feature interference weight coefficient based on a feature that reduces travel speed between the origination location and the destination location, a speed limit change interference weight coefficient based on a feature where a speed limit is changed between the origination location and the destination location, a minimum speed limit interference weight coefficient based on a feature of a minimum posted speed limit between the origination location and the destination location, wherein the probable event interference weight coefficient is calculated by adding a value of: a probable event speed reducing feature interference weight coefficient based on a feature that reduces travel speed between the origination location and the destination location, and wherein the scheduled event interference weight coefficient is calculated by adding a value of: a scheduled event speed reducing feature interference weight coefficient based on a feature that reduces travel speed between the origination location and the destination location, a speed limit change interference weight coefficient based on a change in speed limit between the origination location and the destination location, and a traffic pattern schedule interference weight coefficient based on historical data of traffic volume that reduces travel speed between the origination location and the destination location.

Another exemplary aspect of the present invention includes wherein the cumulative change in altitude interference weight coefficient is calculated by determining a product of a distance and an energy use coefficient based on an estimated grade.

Another exemplary aspect of the present invention includes wherein the curve radius interference weight coefficient is calculated by determining a product of a curve distance and a curve radius coefficient inversely proportional to the radius of the curve.

Another exemplary aspect of the present invention includes wherein the speed reducing feature interference weight coefficient is calculated by retrieving a value corresponding to an estimated energy use when traversing the speed reducing feature.

Another exemplary aspect of the present invention includes wherein the speed limit change interference weight coefficient is calculated by a value corresponding to an estimated energy use when one of speeding up to an increased speed limit, and slowing down to a decreased speed limit.

Another exemplary aspect of the present invention includes wherein the minimum speed limit interference weight coefficient is calculated by determining a product of a distance and an estimated energy use at a corresponding minimum speed limit.

Another exemplary aspect of the present invention includes wherein the probable event speed reducing feature interference weight coefficient is calculated by determining a product of a maximum estimated energy use corresponding to traversing a speed reducing feature and a probability of the speed reducing feature of occurring.

Another exemplary aspect of the present invention includes wherein the scheduled event speed reducing feature interference weight coefficient is calculated by determining based on a schedule if a speed reducing feature will be encountered, and if so, by then retrieving a value corresponding to an estimated energy use when traversing the speed reducing feature.

Another exemplary aspect of the present invention includes wherein the speed limit change interference weight coefficient is calculated by determining based on a schedule if a speed limit change will be encountered, and if so, by retrieving a value corresponding to an estimated energy use when one of speeding up to an increased speed limit, and slowing down to a decreased speed limit.

Another exemplary aspect of the present invention includes wherein the traffic pattern schedule interference weight coefficient is calculated by determining an additional estimated energy use based on a time of day corresponding to a volume of traffic.

Another exemplary aspect of the present invention includes wherein the probable event interference weight coefficient is calculated by adding a minimum energy use value to a product of a maximum energy use value and a probability of the probable event to occur.

Another exemplary aspect of the present invention includes wherein the scheduled event interference weight coefficient is calculated by adding a minimum energy use value to a product of a maximum energy use value and a schedule coefficient, wherein the schedule coefficient is "1" when a scheduled event is one of occurring and scheduled to create an interference, and "0" when a scheduled event is one of not occurring and scheduled to not create an interference.

Another exemplary aspect of the present invention includes wherein the scheduled event interference weight coefficient is calculated by adding a minimum energy use value to a product of a maximum energy use value and a schedule coefficient, and a traffic volume coefficient, wherein the schedule coefficient is "1" when a scheduled event is one of occurring and scheduled to create an interference, and "0" when a scheduled event is one of not occurring and scheduled to not create an interference, and wherein the traffic volume coefficient is proportional to a value of traffic volume and only increases the scheduled event interference weight coefficient corresponding to additional traffic volume.

Another exemplary aspect of the present invention includes an apparatus that calculates a navigation route based on an estimated energy consumption value, the apparatus including a device that receives an origination location and a destination location, a route determining device that calculates a plurality of potential routes based on map route data between the origination location and the destination location, a distance calculating device that determines a cumulative distance for each of the plurality of potential routes, a distance weight coefficient assigning device that assigns a distance weight for each cumulative distance for each of the plurality of potential routes, the distance weight coefficient corresponding to an estimated energy consumption value based on the determined cumulative distance, a cumulative interference weight coefficient determining device that determines a cumulative interference weight coefficient for each of the plurality of potential routes, the cumulative interference weight coefficient corresponding to an estimated interference energy consumption value based on traversing at least one interference on the potential route, the cumulative interference weight coefficient comprises the sum of: a cumulative fixed event interference weight coefficient, a cumulative probable event interference weight coefficient, and a cumulative scheduled event interference weight coefficient, a total route energy consumption weight coefficient determining device that determines a total route energy consumption weight coefficient for each of the plurality of potential routes by adding the distance weight coefficients of each of the plurality of potential routes to the corresponding cumulative interference weight coefficients of each of the plurality of potential routes, and a route selecting device that selects a route from the plurality of potential routes based on a lowest total value energy consumption weight coefficient from the determined total route energy consumption weight coefficients, wherein the cumulative fixed event interference weight coefficient is calculated by adding a value of: a cumulative change in altitude interference weight coefficient based on a cumulative change in altitude between the origination location and the destination location, a curve radius interference weight coefficient based on a size of a curve radius between the origination location and the destination location, and a speed reducing feature interference weight coefficient based on a feature that reduces travel speed between the origination location and the destination location, a speed limit change interference weight coefficient based on a feature where a speed limit is changed between the origination location and the destination location, a minimum speed limit interference weight coefficient based on a feature of a minimum posted speed limit between the origination location and the destination location, wherein the probable event interference weight coefficient is calculated by adding a value of: a probable event speed reducing feature interference weight coefficient based on a feature that reduces travel speed between the origination location and the destination location, and wherein the scheduled event interference weight coefficient is calculated by adding a value of: a scheduled event speed reducing feature interference weight coefficient based on a feature that reduces travel speed between the origination location and the destination location, a speed limit change interference weight coefficient based on a change in speed limit between the origination location and the destination location, and a traffic pattern schedule interference weight coefficient based on historical data of traffic volume that reduces travel speed between the origination location and the destination location.

With its unique and novel features, the present invention provides a method of calculating a navigation route based on estimated energy consumption.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 1 illustrates a first exemplary embodiment of the method of calculating a navigation route based on estimated energy consumption showing a schematic diagram of alternate calculated routes from the same origination and destination location, according to an exemplary aspect of the present invention;

FIG. 2 illustrates a first exemplary embodiment of the method of calculating a navigation route based on estimated energy consumption, showing an interference event table, according to an exemplary aspect of the present invention;

FIG. 3A illustrates a first exemplary embodiment of the method of calculating a navigation route based on estimated energy consumption showing a first portion of a logic flowchart, according to an exemplary aspect of the present invention.

DETAILED DESCRIPTION OF EXEMPLARY EMBODIMENTS OF THE INVENTION

Figure 3B:
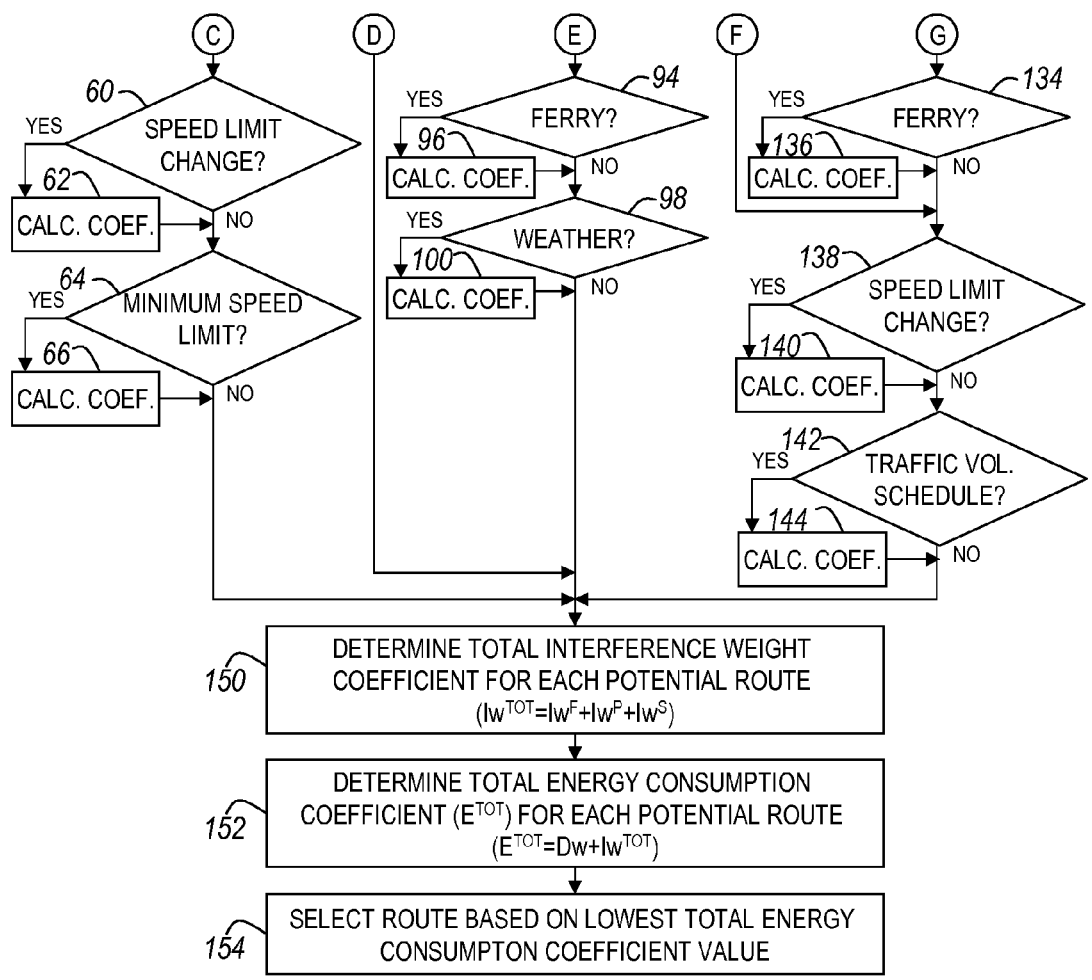
FIG. 3B illustrates a first exemplary embodiment of the method of calculating a navigation route based on estimated energy consumption showing a second portion of a logic flowchart, according to an exemplary aspect of the present invention.

Referring now to the drawings, and more particularly to FIGS. 1-3B, there are shown exemplary embodiments of the method and structures of the present invention.

FIG. 1 illustrates a schematic diagram of how a navigation system calculates potential routes between an origination location 2, (A), and a destination location 4, (B). The first route 6 includes a first portion 8 that is ten (10) units long, and a second portion 10 that is fifteen (15) units long having a total length of twenty-five (25) units long. The second route 12 includes a first portion 14 that is five (5) units long, a second portion 16 that is four (4) units long, a third portion 18 that is twenty (20) units long, and a final portion 20 that is five (5) units long, having a total length of thirty-four (34) units long. Therefore, the second route 12, thirty-four (34) units long, nine (9) units longer than the first route 6.

However, assuming for the purpose of illustrating the present invention, if the shorter first route 6, traverses a mountain pass, and the longer second route 12 is at relatively the same elevation, the navigation system of the prior art would normally select the shorter first route 6 (or the faster route based on an estimated total travel time).

Applicant's present invention allows for the calculation of parameters having estimated energy consumption values to determine the most economic route, that is, the route having the least estimated energy consumption value. In the example above, the present invention would identify either the topography of the terrain for the first 6 and second 12 routes, or determine a difference in elevation between each portion of the proposed routes. Portions are the route having steeper grades would receive a higher value indicating a greater estimated energy consumption value, whereas portions of the route having a decline or a level grade would receive a lesser value indicating a lower estimated energy consumption value.

Each of these estimated energy consumption values are added for each of the proposed routes and the determination is made as to which route has the lowest estimated energy consumption value for presentation to a user.

In determining an estimated energy consumption value, each distance of every portion of the potential routes must be calculated as is typically common in navigation systems of the prior art. The present invention first calculates a distance weight coefficient for each portion of the potential routes based on their distances to estimate an energy consumption value based on the distance of each portion. The present invention then calculates an interference weight coefficient for each portion of the potential routes based on any number of interference events that must be traversed between the origination and destination locations. The sum of the total distance weight coefficients and the total interference weight coefficients for each route are compared, and the route with the lowest estimated energy consumption value is selected for presentation to a user.

FIG. 2 illustrates an interference event table 20 having three categories of events: fixed interference events 22; probable interference events 24; and, scheduled interference events 26. Each category of these interference events will be described herein below.

Fixed interference events 22 include calculated coefficients representing: 1) a change in altitude between the origination and destination locations, or between each portion of the potential route, as briefly described above; 2) a curve radius; 3) speed reducing features, including, A) stop signs, and B) roundabouts; 4) speed limit changes; and, 5) minimum posted speed limits.

A cumulative change in altitude interference weight coefficient is determined based on the cumulative change in altitude between the origination location and the destination location. One alternative method of calculating the cumulative change in altitude interference weight coefficient is to take merely the difference between the origination location and the destination location. However, more accurate estimations of the cumulative altitude interference weight coefficient may be determined by the difference in altitude between each portion of the potential route, or for even greater accuracy, determining a difference in altitude along a fixed incremental distance.

A curve radius interference weight coefficient is based on a size of a curve radius between the origination location and the destination location. Smaller curve sizes require a larger estimated energy consumption value; therefore the curve radius size is inversely proportional to the estimated energy consumption value.

A speed reducing feature interference weight coefficient may be based on features that reduce travel speed between the origination location and the destination location, for example, stop signs and roundabouts at known locations that cause the traveler to either stop or significantly reduce their speed.

A speed limit change interference weight coefficient is based on the occurrence of a speed limit change in between the origination location and the destination location. The change in speed limit may be either increased or a decreased, yet in either situation an estimated energy consumption value may be associated with the corresponding weight coefficient. For example, an increase in speed limit may require a greater interference weight coefficient representing the increase in demand for fuel to achieve the new speed limit. Alternately, a decrease in a speed limit may indicate a lowering of the average fuel economy of a vehicle at a decreased speed.

A minimum speed limit interference weight coefficient is based on a minimum posted speed limit between the origination location and the destination location. For example, a minimum speed limit may be above a level where an optimum fuel economy for a commercial vehicle is maintained. Portions of a proposed route may include an interference weight coefficient corresponding to a high minimum speed limit representing a larger value than portions of a proposed route having a minimum speed limit where better fuel economy is maintained.

Probable interference events 24 include calculated coefficients representing: 1) speed reducing features including, A) traffic lights, B) pedestrian crossings, C) livestock crossings, D) train crossings, E) yield or right of ways, F) ferries without an operation schedule, and G) particular weather features.

A probable speed reducing feature interference weight coefficient may be based on features that reduced travel speed between the origination location and the destination location where there is some uncertainty as to whether a speed reducing feature will occur when a traveler traverses it. Probability data may include stored data accessed by the navigation system, or may include data collected by navigation system in real-time, for example, on mobile navigational systems. Each probable event has a value from 1 to 99%, since it is not known whether each probable event will occur, (i.e., 100%), or will not occur (i.e., 0%) at the time a traveler encounters it.

Each of the above types of probable events has a corresponding probable event interference weight coefficient based on the product of a maximum estimated energy consumption value if the probable event requires the traveler to completely stop, or a significantly slowdown and a probability coefficient representing the likelihood of the probable event requiring the traveler to either stop or slow down.

Some of the above types of probable events may have a constant value added to the probable event interference weight coefficient such as the pedestrian crossing, where a traveler would always slow down a certain amount, whether or not pedestrians are actually in the crosswalk. An example of this may be a school zone with a pedestrian crossing.

Additionally, particular weather features qualify for probable events having an interference weight coefficient for particular weather patterns, for example, a mountain pass that frequently is snowed in, or a low-lying area often subject to dense fog at a particular time of day or season.

Scheduled interference events 26 include calculated coefficients representing: 1) speed reducing features including, A) a stop sign with traffic volume, B) a roundabout with traffic volume, C) a pedestrian/school crossing during school or known busy pedestrian traffic hours, D) a train crossing on a schedule, E) a yield/right of way with traffic volume, and, F) a ferry on an operating schedule; 2) speed limit changes on a schedule; and 3) a traffic pattern schedule.

A scheduled event interference weight coefficient may be based on features that occur according to a predetermined schedule that a traveler would encounter between the origination location and the destination location. The scheduled events may have stored schedules in a navigation system or a networked computer system, or may include data schedules collected and modified in real-time by a mobile navigation system.

A scheduled a speed reducing feature interference weight coefficient may be based on scheduled features that reduce travel speed between the origination location and the destination location. For example, a stop sign, roundabout, and a yield/right of way may all be subject to a traffic pattern schedule at certain times today where an interference weight coefficient is increased due to an increased volume of traffic according to a schedule.

A pedestrian/school schedule crossing interference weight coefficient may be based on a schedule of a pedestrian/school crossing, for example, during school zone hours. These crossing interference weight coefficients may be increased due an increase in the volume of pedestrian traffic according to a pedestrian traffic/school zone schedule.

A train crossing schedule interference weight coefficient may be calculated based on known train schedules and a length of the train corresponding to duration of time at a particular train crossing point. For example, if a train is scheduled to be at a location at a particular time when a user would be traverse in a train crossing, a train crossing interference weight coefficient will be calculated based on the event of waiting for train. Additionally, a traffic schedule interference weight coefficient may be considered in conjunction with the train crossing interference weight coefficient to take into account the larger volume of stopped traffic at a particular time of the day according to a traffic volume schedule.

Similar to the train crossing schedule interference weight coefficient, a ferry schedule crossing interference weight coefficient may be calculated based on a known ferry crossing schedule and a length of crossing corresponding to the duration of time when the particular ferry crosses between the origination and destination locations. Additionally, a traffic schedule interference weight coefficient may be considered in conjunction with the ferry crossing interference weight coefficient to take into account a larger volume of traffic to be moved via the ferry at a particular time of day according to a traffic volume schedule.

A speed limit change schedule interference weight coefficient may be calculated based on a known schedule of a change in speed limit. For example, as mentioned above, a school zone may have a reduced speed limit during particular hours of school. Additionally, as above, the traffic schedule interference weight coefficient may be considered in conjunction with the speed limit change interference weight coefficient to take into account the large volume of traffic during a particular schedule speed limit change time.

A traffic pattern schedule interference weight coefficient may be used in concert with other interference weight coefficients, as described above, or independently based merely on an estimated traffic volume schedule.

FIGS. 3A and 3B illustrate the logic flowchart the method of calculating a navigation route based on an estimated energy consumption value of the present invention.

FIG. 3A illustrates the method of receiving an origination and destination location 30 at a mobile navigation system or computer networked navigation system. The navigation system then determines potential routes between the received locations 32, and determines the cumulative distance (D) for each of the potential routes 34. The navigation system then assigns a distance weight coefficient (Dw) for each potential route 36, and begins to calculate it the cumulative interference weight coefficient (Iw) for each potential route 38.

First, a determination of a cumulative fixed event interference weight coefficient ($Iw^F$) is made for each potential route 40. The navigation system determines if there is a change in altitude 42 between the origination and destination locations, and if so, a calculated change in altitude coefficient 44 is determined. Next, the system determines if there is a small curve radius 46, and if so, a calculated small curve radius coefficient 48 is determined. Then, the system determines if there is any speed reducing features 50 such as a stop sign 52, or a roundabout 56, and if so, the system calculates a stop sign coefficient 54, or a calculated roundabout coefficient 58, respectively. FIG. 3B continues to illustrate that the system then determines if there any speed limit changes 60, and if so, a calculated speed limit change coefficient 62 is determined. Finally, the system then determines any minimum posted speed limit 64, and if so, a calculated minimum speed limit coefficient 66 is determined. Each of the above-calculated fixed event interference weight coefficients are added together to arrive at the cumulative fixed event interference weight coefficient 40, ($Iw^F$).

Second, the determination of a cumulative probable event interference weight coefficient ($Iw^P$) is made for each potential route 70. The navigation system determines if there are any speed reducing features 72 such as a traffic light 74, a pedestrian crossing 78, a livestock crossing 82, a train crossing 86, a yield/right of way 90, (as continued in FIG. 3B), a ferry crossing 94, or a particular weather event 98, and if so, the system calculates a traffic light coefficient 76, a pedestrian crossing coefficient 80, a livestock crossing coefficient 84, a train crossing coefficient 88, a yield/right of way coefficient 92, a ferry crossing coefficient 96, and a weather condition coefficient 100, respectively. Each of the above-calculated probable event interference weight coefficients are added together to arrive at a cumulative probable event interference weight coefficient 70, ($Iw^P$).

Third, the determination of a cumulative scheduled event interference weight coefficient ($Iw^S$) is made for each potential route 110. The navigation system determines if there are any speed reducing features 112 that are subject to a known schedule such as stop sign 114 subject to a volume of traffic according to a schedule, a roundabout 118 subject to a volume of the traffic according to a schedule, a pedestrian crossing 122 subject to a schedule of pedestrian traffic, a train crossing 126 subject to a train crossing schedule, a yield/right of way 130 subject to a volume of traffic according to a schedule, (as continued in FIG. 3B), and a ferry crossing 134 subject to a scheduled crossing of a ferry. If any of the scheduled events occur, the navigation system calculates a corresponding stop sign coefficient 116, a roundabout coefficient 120, a pedestrian crossing coefficient 124, a train crossing coefficient 128, a yield/right of way coefficient 132, and a ferry crossing coefficient 136, respectively.

Additionally, the navigation system determines if there is any speed limit change 138 according to a schedule, and if so, the navigation system calculates a speed limit change coefficient 140. Also, the navigation system determines if there is any traffic volume schedule 142 to be taken into account, and if so, the navigation system calculates a traffic volume schedule coefficient 144. Each of the above-calculated scheduled event interference weight coefficients are added together to arrive at a cumulative scheduled event interference weight coefficient 110 ($Iw^S$).

Navigation system then determines the total interference weight coefficient $Iw^{TOT}$ for each potential route 150 by adding together the cumulative fixed event interference weight coefficient ($Iw^F$), the cumulative probable event interference weight coefficient ($Iw^P$), and the cumulative scheduled event interference weight coefficient ($Iw^S$). Thereafter, the navigation system determines the total energy consumption efficient ($E^{TOT}$) for each potential route 152 by adding the distance weight coefficient (Dw) and the total interference weight coefficient ($Iw^{TOT}$) for each potential route.

The navigation system then selects the route based on the lowest total energy consumption coefficient value 154.

While the invention has been described in terms of one or more exemplary embodiments, those skilled in the art will recognize that the invention can be practiced with modification within the spirit and scope of the appended claims. Specifically, one of ordinary skill in the art will understand that the drawings herein are meant to be illustrative, and the design of the inventive assembly is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is;

1. A method of calculating a navigation route based on an estimated energy consumption value, said method comprising:

receiving an origination location and a destination location;

determining a plurality of potential routes based on map route data between said origination location and said destination location;

determining a cumulative distance for each of said plurality of potential routes;

assigning a distance weight coefficient for each cumulative distance for each of said plurality of potential routes, said distance weight coefficient corresponding to an estimated distance energy consumption value based on said determined cumulative distance;

determining a cumulative interference weight coefficient for each of said plurality of potential routes, said cumulative interference weight coefficient corresponding to an estimated interference energy consumption value based on traversing at least one interference on said potential route, said cumulative interference weight coefficient comprises the sum of:

a cumulative fixed event interference weight coefficient;

a cumulative probable event interference weight coefficient; and a cumulative scheduled event interference weight coefficient;

determining total route energy consumption weight coefficients for each of said plurality of potential routes by adding said distance weight coefficients of each of said plurality of potential routes to said corresponding cumulative interference weight coefficients of each of said plurality of potential routes; and selecting a route from said plurality of potential routes based on a lowest total route energy consumption weight coefficient from said determined total route energy consumption weight coefficients;

wherein said cumulative fixed event interference weight coefficient is calculated by adding a value of:

a cumulative change in altitude interference weight coefficient based on a cumulative change in altitude between said origination location and said destination location;

a curve radius interference weight coefficient based on a size of a curve radius between said origination location and said destination location; and a speed reducing feature interference weight coefficient based on a feature that reduces travel speed between said origination location and said destination location;

a speed limit change interference weight coefficient based on a feature where a speed limit is changed between said origination location and said destination location;

a minimum speed limit interference weight coefficient based on a feature of a minimum posted speed limit between said origination location and said destination location;

wherein said probable event interference weight coefficient is calculated by adding a value of:

a probable event speed reducing feature interference weight coefficient based on a feature that reduces travel speed between said origination location and said destination location; and wherein said scheduled event interference weight coefficient is calculated by adding a value of:

a scheduled event speed reducing feature interference weight coefficient based on a feature that reduces travel speed between said origination location and said destination location;

a speed limit change interference weight coefficient based on a change in speed limit between said origination location and said destination location; and a traffic pattern schedule interference weight coefficient based on historical data of traffic volume that reduces travel speed between said origination location and said destination location.

* * * * *